United States Patent
Stefan et al.

(10) Patent No.: US 8,567,078 B2
(45) Date of Patent: Oct. 29, 2013

(54) ROTARY CONSTRUCTION LASER

(75) Inventors: Barth Stefan, Felkirch (AT); Manfred Ammann, Lauterach (AT)

(73) Assignee: Hilti Aktiengesellschaft, Schaan (LI)

( * ) Notice: Subject to any disclaimer, the term of this patent is extended or adjusted under 35 U.S.C. 154(b) by 70 days.

(21) Appl. No.: 12/536,433

(22) Filed: Aug. 5, 2009

(65) Prior Publication Data

US 2010/0031521 A1 Feb. 11, 2010

(30) Foreign Application Priority Data

Aug. 6, 2008 (DE) .................... 10 2008 041 033

(51) Int. Cl.
G01C 5/00 (2006.01)

(52) U.S. Cl.
USPC ............................ 33/290; 33/286; 33/DIG. 21

(58) Field of Classification Search
USPC .............................. 33/286, 290, 291, DIG. 21
See application file for complete search history.

(56) References Cited

U.S. PATENT DOCUMENTS

| | | | |
|---|---|---|---|
| 4,993,161 A * | 2/1991 | Borkovitz .................. | 33/291 |
| 5,552,886 A * | 9/1996 | Kitajima et al. ............ | 33/291 |
| 5,606,802 A | 3/1997 | Ogawa | |
| 5,790,248 A * | 8/1998 | Ammann .................... | 33/283 |
| 6,035,540 A * | 3/2000 | Wu et al. ................... | 33/286 |
| 6,163,373 A | 12/2000 | Ohtomo et al. | |
| 6,195,901 B1 * | 3/2001 | Falb .......................... | 33/286 |
| 6,568,094 B2 * | 5/2003 | Wu ............................. | 33/281 |
| 6,763,595 B1 * | 7/2004 | Hersey ....................... | 33/286 |
| 6,763,596 B1 * | 7/2004 | Puri et al. .................. | 33/286 |
| 6,848,188 B2 * | 2/2005 | Tacklind et al. ........... | 33/290 |
| 7,418,786 B2 * | 9/2008 | Miyata ....................... | 33/291 |
| 7,469,481 B2 * | 12/2008 | Nash et al. ................. | 33/286 |
| 7,493,701 B2 * | 2/2009 | Chen .......................... | 33/291 |
| 2002/0092185 A1 * | 7/2002 | Wu ............................. | 33/281 |
| 2003/0145474 A1 * | 8/2003 | Tacklind et al. ........... | 33/290 |
| 2003/0229997 A1 | 12/2003 | Gamal et al. | |
| 2007/0103672 A1 | 5/2007 | Kumagai et al. | |
| 2007/0130785 A1 * | 6/2007 | Bublitz et al. ............. | 33/290 |
| 2008/0028624 A1 * | 2/2008 | Chen .......................... | 33/286 |
| 2008/0078091 A1 * | 4/2008 | McCracken ................ | 33/291 |
| 2008/0209745 A1 * | 9/2008 | Tamamura .................. | 33/286 |
| 2010/0031521 A1 * | 2/2010 | Stefan et al. ............... | 33/290 |
| 2010/0293798 A1 * | 11/2010 | Wilson et al. .............. | 33/286 |

FOREIGN PATENT DOCUMENTS

| | | |
|---|---|---|
| EP | 0 854 351 A2 | 7/1998 |
| EP | 1 006 339 A2 | 6/2000 |
| EP | 1 387 467 A1 | 2/2004 |
| EP | 1 411 371 A1 | 4/2004 |
| WO | WO 03/048684 A1 | 6/2003 |

OTHER PUBLICATIONS

European Search Report, dated Jan. 17, 2012, 8 pages.

* cited by examiner

*Primary Examiner* — Yaritza Guadalupe-McCall
(74) *Attorney, Agent, or Firm* — Crowell & Moring LLP

(57) ABSTRACT

A laser instrument is disclosed. The laser instrument having a laser unit, a drive device for tilting the laser unit, and a damper device between the drive device and the laser unit.

20 Claims, 2 Drawing Sheets

ROTARY CONSTRUCTION LASER

This application claims the priority of German Patent Document No. 10 2008 041 033.0, filed Aug. 6, 2008, the disclosure of which is expressly incorporated by reference herein.

BACKGROUND AND SUMMARY OF THE INVENTION

The invention relates to a laser device having a laser unit, a drive device and a damper device for protecting the drive device.

In this case, a laser instrument should be understood as a construction laser such as those that are used in the construction industry for the purposes of defining, transmitting or leveling planes, lines or points. As a result, static construction lasers such as point or line lasers can likewise be subsumed under the term "laser instrument" just like rotary construction lasers, in which the laser unit emits an at least partially rotating laser beam. In particular, the invention is used with rotary construction lasers having a laser unit embodied as a rotational unit, which is why for the sake of simplicity the following specification also relates to this type of construction laser. However, it should be noted that this does not represent a restriction of the protective scope and the invention also relates to all other types of construction lasers having an adjustable laser unit.

Rotary construction lasers having a laser unit, which emits an at least partially rotating laser beam, are used primarily in the construction industry in order to define horizontal, vertical or defined inclined planes on walls, ceilings and floors. Rotary construction lasers are also used, for example, in scanning operations to establish predefined sections of planes or markings (points, lines, etc).

In the case of a rotary construction laser, a rotational unit is essentially adjusted by means of a bearing device. In other words, as a general rule, a rough adjustment is made prior to adjustment, for example, by an operator. This may be accomplished, for example, manually by utilizing levels that are externally visible and attached to the rotary construction laser. Afterwards, the operator may initiate an automatic adjustment, whereby the rotational unit is fine-tuned (adjusted), for example, by means of servomotors or drive devices and the bearing device.

A rugged design is of great significance in the case of rotary construction lasers because equipment in the construction industry is subjected to extraordinary stresses. At the same time, the equipment must posses a high level of precision. For example, the required resolution of the drive for a laser instrument or a rotary construction laser with a specification of 10 to 20 angular seconds is approx. 1 angular second. This produces a resolution of lengths of under 1 µm; such drives are correspondingly sensitive to mechanical overloads such as those that are produced by equipment falling or being set down hard, etc.

The invention is based on the objective of making available a rotary construction laser which adequately protects selected components, for example, the drive device for tilting the laser unit.

The rotary construction laser described in greater detail in the following in accordance with an embodiment features a laser unit. The laser unit may contain a rotational unit, for example, which is rotatably mounted around an axis of rotation by means of ball bearings and features a deflection device. The deflection device can be used in this case to deflect the laser beam and project it on a wall, for example, in order to create the cited markings there.

The rotary construction laser further comprises sensitive components such as, for example, a drive device (stepper motor or the like) for tilting the laser unit. In order to facilitate a tilting of the laser unit, the laser unit is positioned, for example, in a bearing device such as a cardan joint, universal ball joint bearing, or sliding bearing. To tilt the laser unit, the drive can be connected to a drive piston or the like via a thread. During a rotation of the motor, the piston thereby shifts in a pre-definable direction so that a force can be applied to a supporting part that is firmly connected to the housing, for example, a plate or the like. As a result, the drive device can tilt the laser unit.

The supporting part may also be part of the housing. Thus, a force component, which acts between the housing and the to-be-tilted laser unit, can be generated by means of the drive device.

In one embodiment, a damper device may be provided between the drive device and the laser unit. In this case, the drive is not firmly or rigidly connected to the laser unit or to a part that is firmly connected to the laser unit. The drive is connected to the laser unit, for example, by means of, or via, the damper device.

In a further embodiment, the damper device may also be arranged between the housing or a part firmly connected to the housing, such as a supporting part, and the drive device.

As yielded from a generalization of the two described embodiments, the damper device may thus be provided at different locations in the effective direction of the drive. It must only be guaranteed through suitable structural measures that essentially forces in the effective direction of the drive can be damped or absorbed by the damper device.

In other words, the drive device has an effective direction in which a force component can be generated, which acts between the housing and the to-be-tilted laser unit so that the laser unit is tilted. The damper device can also be arranged such that essentially force components in the effective direction of the drive can be damped by means of the damper device.

In this case, "damper device" should be understood as any components that have a damping or spring effect or the like. A damper device is thus suitable for absorbing or containing impulses, shocks, large forces, etc. The damper device may therefore also be designated as a impulse absorbing means or shock absorbing means.

As already indicated above, the laser unit is movably positioned with respect to the housing of the rotary construction laser so that the laser unit can be tilted in a specific range. Because of the movable mounting, due to the mass of the laser unit, a great force can act on the drive in the case of a shock to the housing, in particular, great force components can occur in the effective direction of the drive. For example, a great force component can act on the axis of the drive. The damper device is now arranged such that it can absorb these types of force components. To do so, the damper device may be arranged on the side of the drive which is opposite from the drive shaft (see figures). The damper device may thus be arranged directly between the drive and the laser unit or the motor mounting. In this case, it is assumed that the motor mounting is a part of the laser unit.

The damper device may thus be provided, for example, directly on the drive in the axial direction of the drive shaft. Thus, a damper device is provided according to the invention where in the prior art the drive was previously firmly connected to the laser unit. The damper device, for example a spring, may be pre-stressed and therefore exert a pre-stressing force on the drive device. The damper device may therefore also be designated as a "pre-stressing device."

Thus, force components can essentially be preferably damped in an effective direction of the drive by means of the damper device. The effective direction of the drive may coincide, for example, essentially with the drive shaft of the drive. This is the case, for example, if a design as described above is selected, in which a threaded spindle is provided on the drive shaft, which drives a piston having an internal thread. Thus, vectorial force components, which are parallel to the effective direction of the drive, can be damped by the damper device.

The direction constant (damper constant or spring constant) of the damper device may preferably be selected such that the damper device is not substantially deformed in normal operation. "Normal operation" is when the rotary construction laser is being operated properly. This means that the laser unit is tilted or adjusted so that, for example, a predetermined angle of the laser unit is adjusted with respect to the perpendicular. In normal operation, a leveling line or a marking or the like is projected onto the wall, for example.

In particular, normal operation does not include times when the rotary construction laser is being transported, dropped, set down hard or not being operated properly.

In a preferred embodiment, the direction constant (spring constant or damper constant) of the damper device is selected such that forces due to shocks on the housing can be absorbed by means of the damper device. To establish the direction constant, experiments can be conducted, for example, in which forces are measured, which may occur when it is dropped or when other effects of force that are outside of normal operation may act on the housing. The direction constant may then be selected such that the damper device is deformed during the experimentally determined forces, but not in normal operation. This guarantees that the damper device does not affect the precise adjustment of the inclination of the laser unit in normal operation. A deformation of the damper device only occurs in the case of shocks or the like such as those that may occur when the rotary construction laser is dropped from a specific height.

The damper device may preferably be a spring device. The advantage of this is that a spring is reversible. On the other hand, it is also possible for the damper device to be a non-reversible damper device. For example, the damper device may be an inexpensive non-reversible damping element which can easily be replaced after a shock to the housing. In this case, it is possible to use a damping element comprised of an elastomer.

In a further preferred embodiment, the rotary construction laser may have a restoring spring device, by means of which a restoring force with a restoring force component can be generated against the effective direction of the drive direction. In this case, the restoring force component is essentially opposing the force component that can be damped by means of the damper device.

In a preferred embodiment, the direction constant of the damper device may be a multiple of the spring constant of the restoring spring. For example, the damper constant or spring constant of the damper device may correspond to 5 to 10-fold or 10 to 20-fold of the spring constant of the restoring spring. A force of approx. 5-10 N in the zero position of the laser device can thereby be generated by means of the restoring spring.

According to a further embodiment, the rotary construction laser may also have additional drive devices for tilting the laser unit, wherein additional damper devices are each arranged between the additional drive devices and the laser unit. In particular, the rotary construction laser may have two drive devices, wherein an inclination in the predetermined swivel plane is possible with each of the two drive devices.

The damper device may preferably comprise a spring and a damping element, i.e., the damper device is a combined spring/damper unit. As a result, force containment and at least partial absorption of the force are possible. Thus, an effect is generated in this case that is essentially like that of a shock absorber.

An embodiment of the invention will be explained in the following on the basis of the figures.

DETAILED DESCRIPTION OF THE DRAWINGS

Figure 1:
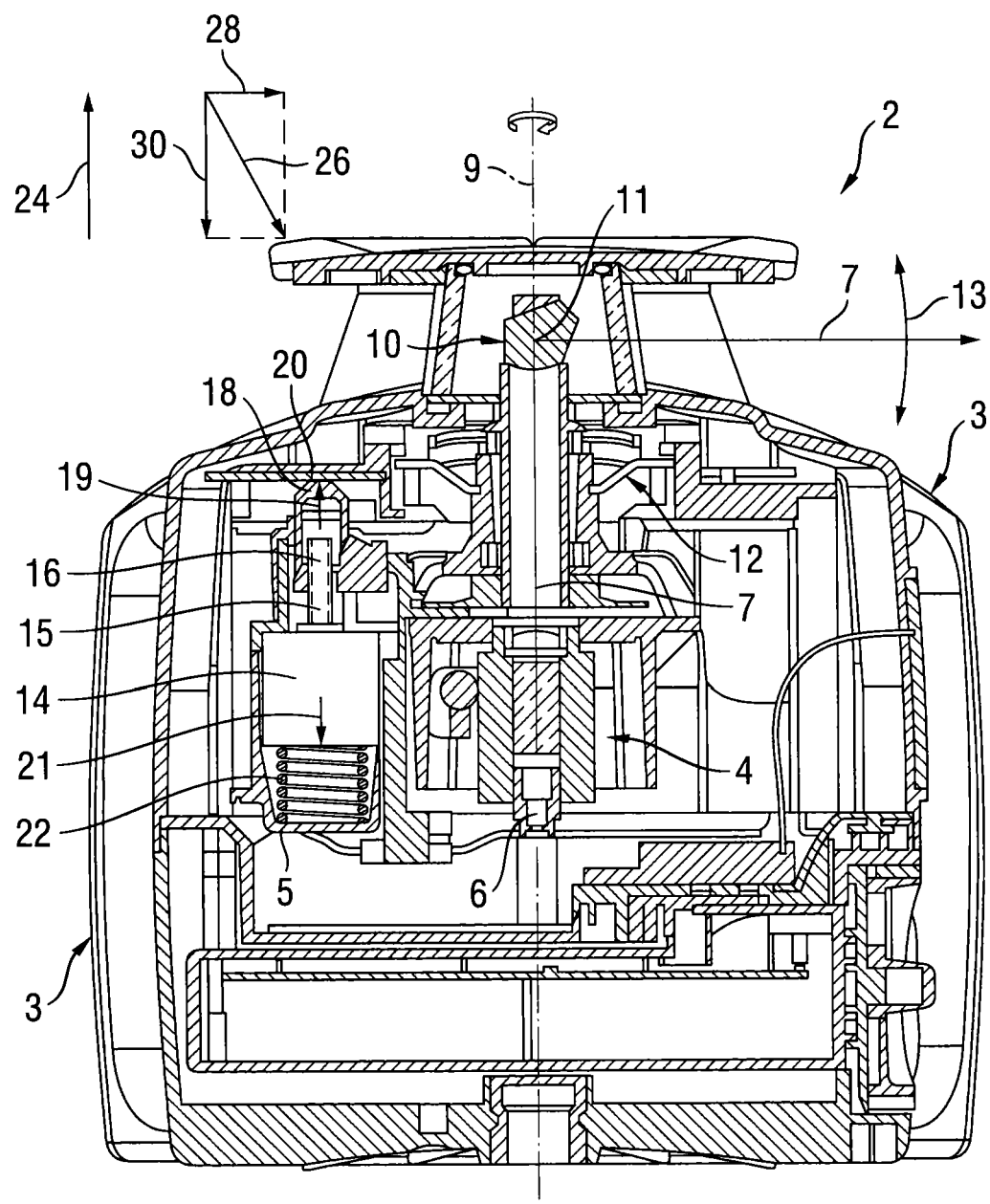
FIG. 1 is a sectional view of the rotary construction laser.

FIG. 1 depicts a rotary construction laser 2 having a laser unit 4. The laser unit 4 is comprised of, for example, a laser 6 for generating a laser beam 7 and a rotational unit, which can be rotated around an axis of rotation 9. The laser unit 4 also includes a deflection device 10 for deflecting the laser beam 7 at a deflection point 11. In addition, the laser unit 4 comprises a mounting 5 for a drive 14.

The laser unit 4 is mounted on a bearing device 12. The bearing device 12 can be, for example, a universal ball joint bearing, a cardan bearing or a cardan-like bearing, which facilitates a tilting of the laser unit 4 in a predetermined swivel plane. As a result, the laser unit 4 is movable with respect the housing 3. When the laser unit 4 is tilted, the laser beam 7 can be tilted with respect to the housing 3, as indicated by the arrow 13.

The rotary construction laser 2 also features the drive 14 with a drive shaft 15. Provided on the drive shaft 15 is a threaded spindle 16, which engages in a piston 18 having an internal thread. As a result, the piston 18 can be moved up and down by rotating the drive shaft 15 with respect to the axis of the drive shaft 15.

For example, the piston 18 can be moved away by the drive 14 (upward in the drawing plane in FIG. 1) and thus exert a force 19 on a support plate 20, which is firmly connected to the housing 3. As a result, a further force 21 is exerted on a damper device 22.

As shown, the damper device 22 lies between the drive 14 and the laser unit 4. As a result, the force 21 is transmitted via the damper device 22 to the laser unit 4 or the mounting 5.

The damper device 22 is a spring in the embodiment depicted in FIG. 1. However, a non-reversible damping element or a combination of a damping element and a spring may also be used as an alternative.

The spring constant or direction constant of the damper device 22 is advantageously selected such that the damper device 22 is not substantially deformed in normal operation.

In the depiction in FIG. 1, it is assumed that the force 19 is a force component which is generated by the drive 14 in a previously described manner, and therefore, is a force which acts in normal operation. As a result, the force 21 does not substantially deform the damper device 22.

The damper device 22 may be pre-stressed so that the motor 14 is positioned in a manner that is free of play.

It is clear from the foregoing description that the drive 14 has an effective direction 24. The piston 18 moves along the effective direction 24.

A shock may have an effect on the housing 3 because of the rotary construction laser 2 being dropped or during transport. In doing so, a great force impacts the housing 3, which is identified schematically in FIG. 1 by reference number 26. The force 26 that occurs due to the shock has a first force component 28 and a second force component 30.

Because of the force 26, a correspondingly great force can impact the drive or the sensitive parts connected to the drive, such as, for example, the piston 18, threaded spindle 16, etc., due to the mass/inertia of the laser unit 4. In order to prevent damage to these parts and to the laser unit 4, at least portions of the force 26 can be absorbed by the damper device 22. In particular, forces that act on the drive 14 or the laser unit 4 because of the second force component 30 may be effectively absorbed.

Figure 2:
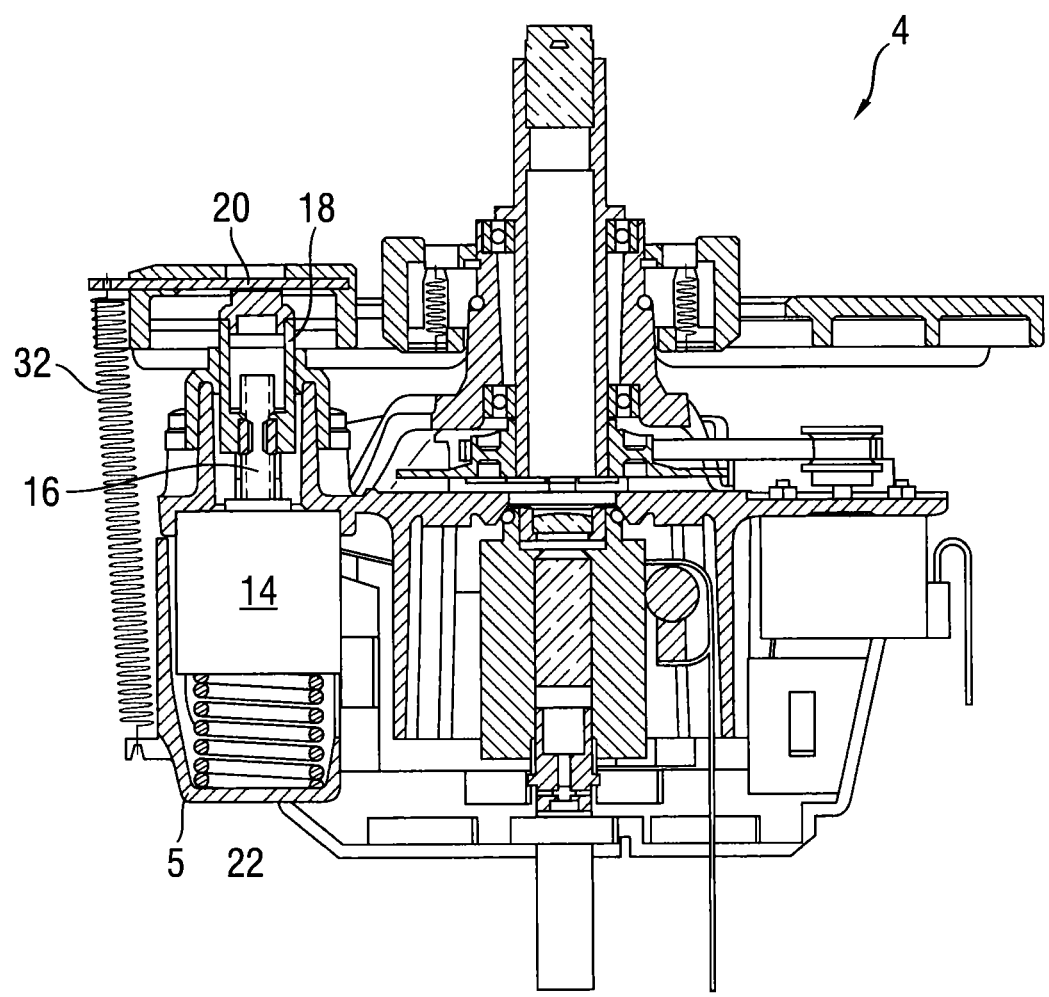
FIG. 2 is a further sectional view with the restoring spring depicted.

The drive 14 thus presses or shifts the piston 18 in a direction. A restoring spring 32 pulls the to-be-adjusted part (laser unit 4) back in the other direction, as depicted in FIG. 2. Due to this mode of operation, a simple solution is attained, which can be pre-stressed (by means of the damper device 22 and the restoring spring 32) and therefore functions in a manner that is free of play.

Danger to the drive without the damper device 22, i.e., a rotary construction laser from the prior art, occurs if too great a force, i.e., one that has not been provided for in normal operation, acts against the drive device (effective direction 24 in FIG. 1). The drive is not stressed or only slightly stressed in the other direction since the restoring spring yields and this force is absorbed at least in part by the restoring spring.

The drive can be reliably protected with the invention. If a great force acts on the housing from the outside, with a force component in the effective direction or parallel to the effective direction of the drive 14, then a corresponding force component, which acts on the drive and could damage the drive, can at least partially be absorbed by the damper device 22.

According to the invention, the drive is not firmly connected in the effective direction to its mounting 5 or the laser unit 4, e.g., screwed down or the like, rather, the damper device 22, for example, a pre-stressing spring, is provided between the mounting and the drive. The pre-stressing spring can be used to hold the motor in its operative position. Within the scope of the specification, the mounting 5 for the motor is thus to be considered part of the laser unit 4.

As can be seen in FIG. 2, the damper device 22 acts opposing the restoring spring 32 and must, thereby, generate a force which represents a multiple of the force of the restoring spring.

In other words, the spring constant or the direction constant of the damper device 22 should be substantially greater than that of the restoring spring 32. As a result, it is possible to prevent the damper device 22 from being deformed in normal operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A laser instrument, comprising:
  a housing;
  a laser unit;
  a drive device for tilting the laser unit, wherein a piston is linearly movable by a rotation of a drive shaft such that a force is applyable by the piston to the housing such that the laser unit is tilted; and
  a damper device, wherein the damper device is arranged between the drive device and the laser unit.

2. The laser instrument according to claim 1, wherein the damper device has a direction constant such that the damper device is not substantially deformed in a normal operation.

3. The laser instrument according to claim 1, wherein the damper device has a direction constant such that a force due to a shock on the housing is absorbable by the damper device.

4. The laser instrument according to claim 1, wherein the damper device is a spring device.

5. The laser instrument according to claim 1, wherein the damper device is a non-reversible damping element.

6. The laser instrument according to claim 1, wherein the damper device includes a spring and a damping element.

7. The laser instrument according to claim 1, wherein the damper device is pre-stressed.

8. A laser instrument, comprising:
  a housing;
  a laser unit;
  a drive device for tilting the laser unit, wherein a force is generatable by the drive device and acts between the housing and the laser unit so that the laser unit is tilted;
  a damper device, wherein the damper device is arranged between the housing and the laser unit; and
  a restoring spring which generates a restoring force against a force dampable by the damper device.

9. The laser instrument according to claim 8, wherein a direction constant of the damper device corresponds to a multiple of a spring constant of the restoring spring.

10. The laser instrument according to claim 9, wherein the direction constant of the damper device corresponds to 5 to 10-fold or 10 to 20-fold of the spring constant of the restoring spring.

11. A laser instrument, comprising:
  a housing;
  a laser unit;
  a drive device for tilting the laser unit, wherein a force is generatable by the drive device and acts between the housing and the laser unit so that the laser unit is tilted;
  a damper device which is arranged between the housing and the laser unit;
  a second drive device for tilting the laser unit; and
  a second damper device arranged between the second drive device and the laser unit.

12. A laser instrument, comprising:
  a housing;
  a laser unit moveably mounted on the housing;
  a drive device for tilting the laser unit, wherein a piston is linearly movable by a rotation of a drive shaft such that a force is applyable by the piston to the housing such that the laser unit is tilted; and
  a damper device, wherein the damper device is arranged between the drive device and the laser unit.

13. The laser instrument according to claim 12, wherein the damper device is a spring.

14. The laser instrument according to claim 12, wherein the damper device is not substantially deformable by a force applied by the drive device to the laser unit via the damper device.

15. The laser instrument according to claim 14, wherein the damper device is deformable by a force generated external to the laser instrument and applied to the housing.

16. A laser instrument, comprising:
a housing;
a laser unit moveably mounted on the housing;
a drive device coupled to the laser unit via a damper device; and
a restoring spring coupled between the laser unit and the housing, wherein a direction constant of the damper device is a multiple of a spring constant of the restoring spring.

17. A method of utilizing a laser instrument, wherein the laser instrument includes a housing, a laser unit moveably mounted on the housing, and a drive device for tilting the laser unit coupled to the laser unit via a damper device, comprising the steps of:
generating a force by the drive device by linearly moving a piston by rotating a drive shaft;
applying the force to the laser unit via the damper device, wherein the damper device is arranged between the drive device and the laser unit; and
tilting the laser unit by the applied force.

18. The method according to claim 17, wherein the step of applying the force to the laser unit via the damper device does not substantially deform the damper device.

19. The method according to claim 18, wherein the damper device is deformable by a force generated external to the laser instrument and applied to the housing.

20. The method according to claim 17, wherein a restoring spring is coupled between the laser unit and the housing and wherein a direction constant of the damper device is a multiple of a spring constant of the restoring spring.

* * * * *